United States Patent
Parikh

[15] 3,676,433
[45] July 11, 1972

[54] IMPROVED PROCESS FOR THE 5α,6α-EPOXIDATION OF Δ$_5$-DOUBLE BONDS

[72] Inventor: Jekishan R. Parikh, Kalamazoo, Mich.

[73] Assignee: The Upjohn Company, Kalamazoo, Mich.

[22] Filed: Sept. 15, 1970

[21] Appl. No.: 72,490

[52] U.S. Cl............260/239.55 R, 260/239.55 C, 260/397.5
[51] Int. Cl................................C07c 169/20, C07c 169/22
[58] Field of Search.............................................260/239.55

[56] References Cited

UNITED STATES PATENTS 3,547,913  12/1970  Sletzinger et al. ................260/239.55

OTHER PUBLICATIONS

Spero et al., J. Am. Chem. Soc. Vol. 78 (1956) page 6213

*Primary Examiner*—Elbert L. Roberts
*Attorney*—John Kekich and Ward F. Nixon

[57] ABSTRACT

An improved process for the stereoselective 5α,6α-epoxidation of isolated 5,6-double bonds in steroid molecules. The process of this invention comprises reacting a steroid containing an isolated 5,6-double bond with peroxytrifluoroacetic acid or peroxytrichloroacetic acid in an organic solvent of low polarity which promotes intramolecular hydrogen bonding in the peracid molecule, and in the presence of a basic buffering agent, to obtain the corresponding 5α,6α-epoxide.

An important characteristic of many pharmacologically active steroids is the presence of a methyl or halogen substituent at the 6α-position. The process of this invention provides an improved method for obtaining important 5α,6α-expoxide intermediates leading to these useful compounds.

11 Claims, No Drawings

PROCESS FOR THE 5α,6α-EPOXIDATION OF Δ-DOUBLE BONDS

BACKGROUND OF THE INVENTION

The epoxidation of steroidal 5,6-double bonds is well known in the art, for example, G. Cooley et al., J. Chem. Soc. 4112 (1957); G. B. Spero et al., J. Am. Chem. Soc. 78, 6213 (1956); J. C. Babcock et al., J. Am. Chem. Soc. 80, 2904 (1958); Camerino et al., U.S. Pat. No. 3,061,616 and George B. Spero, U.S. Pat. No. 3,377,364. The above mentioned prior art shows the epoxidation of certain $\Delta^5$-steroids using common organic peracids such as peracetic, perbenzoic, perpropionic, monoperphthalic, and performic acids to obtain a mixture of the corresponding 5α,6α- and 5β,6β-epoxides. The reactions are carried out in an inert organic solvent such as chloroform, methylene chloride, ethylene dichloride, carbon tetrachloride, benzene, toluene, diethyl ether, mixtures thereof and the like.

The prior art epoxidation processes using well-known peracids such as those mentioned above are not stereo-selective and give mixtures of both the desired corresponding 5α,6α-epoxide and the undesired corresponding 5β,6β-epoxide in ratios ranging from about 50:50 to a maximum of about 70:30. For example, 11α-acetoxy-5-pregnene-3,20-dione 3,20-bisethylene ketal when epoxidized using peracetic acid in chlorobenzene, chloroform, or mixtures thereof in accordance with the prior art process of Spero et al., J. Am. Chem. Soc., 78, 6213 (1956), gives at best only about a 61 percent theoretical yield of the desired 5α,6α-epoxy-11α-acetoxypregnane-3,20-dione 3,20-bisethylene ketal.

The in situ formation of peroxytrifluoroacetic acid, prepared by the addition of trifluoroacetic acid to hydrogen peroxide, and its unique property as an oxidizing agent were first described by W. D. Emmons and A. F. Ferris, J. Am. Chem. Soc. 75, 4623 (1953). The utilization of peroxytrifuoroacetic acid as an epoxidation agent for aliphatic and alicyclic olefins was first reported by W. D. Emmons and A. S. Pagano, J. Am. Chem. Soc. 77, 89 (1955). The use of peroxytrihaloacetic acids, for the stereoselective epoxidation of double bonds in steroidal molecules has not hitherto been known and, in addition, the effects of solvents on the stereoselective course of the epoxidation with these acids is also a new and novel part of the present invention.

BRIEF SUMMARY OF THE INVENTION

Steroids containing the 5α,6α-epoxide function are important intermediates in the synthesis of 6-alkyl and 6-halosteroids such as Medrol (6α-methylprednisolone), Melenges-trol acetate (16-methylene-17α-acetoxy-6-methyl-4,6-pregnadiene-3,20-dione), Provera (6α-methyl-17α-acetoxyproges-terone), Alphadrol (6α-fluoroprednisolone), Haldrone (6α-fluoro-16α-methyl-11β,17α,21-trihydroxy-1,4-pregnadiene-3,20-dione 21-acetate) and many others well known in the art.

In the process for epoxidizing isolated 5,6-double bonds in the steroid molecule with an organic peracid, it has now been discovered that greatly increased yields (greater than 90 percent of theory) of the desired 5α,6α-epoxide can be obtained with very little formation of the undesirable corresponding 5β,6β-epoxide. The high yields of the desired 5α,6α-epoxides obtained by the process of this invention are brought about by epoxidizing a $\Delta^5$-steroid with peroxytrifluoroacetic acid or peroxytrichloroacetic acid in an organic solvent of low polarity which promotes intramolecular hydrogen bonding within the peracid molecule. The reaction is carried out in the presence of a basic buffering agent to prevent decomposition of acid sensitive substrates, for example, to prevent hydrolysis of 3- and 20-ketal groups when present in the starting material and to prevent opening of the oxirane ring.

DETAILED DESCRIPTION OF THE INVENTION

The improved process of this invention is generally applicable to any steroid having an isolated (unconjugated) double bond at the 5,6-position of the steroid molecule. They can also possess keto, hydroxy, alkyl, acyloxy, halo, cyclopropyl, cyclic alkylene ketal and other groups attached to the steroid ring structure, especially at positions 3, 4, 7, 9, 11, 12, 14, 16, 17, 20, and 21 and they can have other double bonds which are unreactive under the conditions of the process of the present invention.

In carrying out the improved process of this invention, the selected starting steroid having an unconjugated double bond at the 5,6-position is dissolved, dispersed or suspended in an organic solvent compatible with the stereo-selective formation of the desired 5α,6α-epoxide of the selected starting material. Organic solvents which are stereoselective to 5α,6α-epoxide formation are those of low polarity which promote intramolecular hydrogen bonding within the selected peracid molecule. The following solvents are representative of those which can be used, for example, methylene chloride, benzene, chlorobenzene, toluene, chloroform, bromobenzene, o-dichlorobenzene, xylene, ethylene dichloride, mixtures thereof and the like. A basic buffering agent is added and the reaction mixture is cooled to a temperature below 0° C.; −10° C. to −30° C. is preferred. The mixture is then treated with a solution of peroxytrifluoroacetic acid or peroxytrichloroacetic acid (prepared in situ in an organic solvent medium of low polarity which promotes intramolecular hydrogen bonding within the selected peracid). The temperature is maintained below 0° C. during the peracid addition and preferrably within the range of from about −10° to about −30° C. Basic buffering agents which can be used include, for example, sodium acetate, potassium acetate, sodium carbonate, potassium carbonate, sodium bicarbonate, potassium bicarbonate, disodium hydrogen phosphate, etc. When the reaction is complete the 5α,6α-epoxide is recovered from the reaction medium by conventional methods, for example, the reaction mixture is made basic by the addition of dilute sodium or potassium hydroxide, the organic phase is separated from the aqueous phase, washed to a neutral pH, filtered and then removed by distillation to give the desired 5α,6α-epoxide. The epoxide thus obtained is further purified if desired by crystallization from a suitable organic solvent such as acetone, acetone-water, ether, ethyl acetate, methylene chloride, benzene and the like.

The following preparations and examples further illustrate the process of this invention but are not to be construed as limiting.

Preparation 1 peroxytrifluoroacetic acid

A solution of 8.5 ml. of trifluoroacetic anhydride in 10 ml. of methylene chloride is cooled to about 0° C. and 2 ml. of 90 percent hydrogen peroxide is added. The solution is stirred at 0° C. for about 15 minutes and then allowed to reach room temperature. For storage purposes the solution of peroxytrifluoroacetic acid, thus obtained, is kept at or below 0° C.

Preparation 2 peroxytrichloroacetic acid

A solution of 9.0 ml. of trichloroacetic anhydride in 10 ml. of methylene chloride is cooled to 0° C. and treated with 90 percent hydrogen peroxide in the manner described in Preparation 1, above, to obtain a solution of peroxytrichloroacetic acid. For storage purposes the solution is advantageously kept at about 0° C. or below.

Example 1 5α,6α-epoxy-11α-acetoxypregnane-3,20-dione 3,20-bisethylene ketal

A reaction mixture of 9.2 g. (0.02 moles) of 11α-acetoxy-5-pregnene-3,20-dione 3,20-bisethylene ketal, 19.6 g. (0.2 moles) of anhydrous potassium acetate, 52 ml. of chloroform (dry) and 52 ml. of chlorobenzene (dry) is cooled to about −20° C. stirring. The solution of peroxytrifluoroacetic acid prepared in Preparation 1 above, is diluted with 100 ml. of methylene chloride, cooled to about −20° C. and added slowly to the reaction mixture while maintaining the temperature at about −20° C. The progress of the reaction is followed by thin layer chromatography (TLC).

When the reaction is complete, the reaction mixture is made basic by the addition of dilute sodium hydroxide solution to a pH of about 9 and stirred for about 1 hour at 12°–14° C. The organic phase is then separated and washed to a neutral pH. Each aqueous wash is back washed with chloroform and the chloroform is added to the organic phase. The combined organic phase and washes are stirred with 0.3 g. of diatomaceous earth (Celite), filtered and the filter cake is washed with three 5 ml. portions of chloroform. The filtrate and washes are combined and concentrated to dryness under vacuum at about 60° C. to give 9.2 g. (96.6 percent yield) of 5α,6α-epoxy-11α-acetoxypregnane-3,20-dione 3,20-bisethylene ketal; m.p. 248°–260° C.; $[\alpha]_D$ –59°.

To 3.0 g. of the 5α,6α-epoxide thus obtained, is added 6 ml. of ethyl acetate. The slurry so obtained is stirred under reflux for about 1 hour, cooled to 15° C. and stirred at 15° C. for 2 hours. The slurry is filtered, washed with a minimum of cold ethyl acetate and dried to give 2.88 g. (92.8 percent yield) of 5α,6α-epoxy-11α-acetoxypregnane-3,20-dione 3,20-bisethylene ketal; m.p. 260.5°–262.5° C.; $[\alpha]_D$ –62°; TLC shows one spot, NMR is consistent with the structure and identical to that of a standard sample of the same product.

Example 2 5α,6α-epoxypregnane-3,20-dione 3,20-bisethylene ketal

A reaction mixture of 8 g. (0.02 moles) of 5-pregnene-3,20-dione 3,20-bisethylene ketal, 19.6 g. (0.2 moles) of anhydrous potassium acetate, 52 ml. of chloroform (dry) and 52 ml. of chlorobenzene (dry) is cooled to about –20° C. with stirring. The solution of peroxytrifluoroacetic acid prepared in Preparation 1, above, is diluted with 100 ml. of methylene chloride, cooled to about –20° C. and added slowly to the reaction mixture while maintaining the temperature at about –20° C. The progress of the reaction is followed by thin layer chromatography (TLC).

When the reaction is complete, the reaction mixture is made basic by the addition of dilute sodium hydroxide solution to a pH of about 9 and stirred for about 1 hour at 12°–14° C. The organic phase is then separated and washed to a neutral pH. Each aqueous wash is back washed with chloroform and the chloroform is added to the organic phase. The combined organic phase and washes are stirred with 0.3 g. of diatomaceous earth (Celite), filtered and the filter cake is washed with three 5 ml. portions of chloroform. The filtrate and washes are combined and concentrated to dryness under vacuum at about 60° C. to give 8.14 g. (97.2 percent yield) of 5α,6α-epoxypregnane-3,20-dione-3,20-bisethylene ketal; NMR analysis of the product showed the presence of less than 5 percent of the corresponding 5β,6β-epoxide. An analytical sample prepared by chromatography gave 5α,6α-epoxypregnane-3,20-dione 3,20-bisethylene ketal; m.p. 180.5°–183° C.; $[\alpha]_D^{CHCl_3}$ –50°.

Example 3: 5α,6α-epoxy-11β-hydroxypregnane-3,20-dione 3,20-bisethylene ketal

A reaction mixture of 4.2 g. (0.01 moles) of 11β-hydroxy-5-pregnene-3,20-dione 3,20-bisethylene ketal, 9.65 g. (0.1 moles) of anhydrous potassium acetate, 26 ml. of chloroform (dry) and 26 ml. of chlorobenzene (dry) is cooled to about –20° C. with stirring. The solution of peroxytrifluoroacetic acid prepared in Preparation 1, above, is diluted with 50 ml. of methylene chloride, cooled to about –20° C. and added slowly to the reaction mixture while maintaining the temperature at about –20° C. The progress of the reaction is followed by thin layer chromatography (TLC).

When the reaction is complete, the reaction mixture is made basic by the addition of dilute sodium hydroxide solution to a pH of about 9 and stirred for about 1 hour at 12°–14° C. The organic phase is then separated and washed to a neutral pH. Each aqueous wash is back washed with chloroform and the chloroform is added to the organic phase. The combined organic phase and washes are stirred with 1.5 g. of diatomaceous earth (Celite), filtered and the filter cake is washed with three 5 ml. portions of chloroform. The filtrate and washes are combined and concentrated to dryness under vacuum at about 60° C. to give 4.32 g. (99.0 percent yield) of 5α,6α-epoxy-11β-hydroxypregnane-3,20-dione 3,20-bisethylene ketal; NMR analysis shows the presence of less than 5 percent of the 5β,6β-epoxide. An analytical sample recrystallized from ethyl acetate gives 5α,6α-epoxy-11β-hydroxypregnane-3,20-dione 3,20-bisethylene ketyl; m.p. 255.3°–260.3° C.;$[\alpha]_D^{CHCl_3}$ –27°; NMR and IR spectra support the structure.

In the same manner following the procedure of Examples 1, 2 and 3 analogous results are obtained when a solution of peroxytrichloroacetic acid (prepared in Preparation 2, above) is used in place of a solution of peroxytrifluoroacetic acid.

Example 4 5α,6α-epoxy-3β-hydroxy-16-pregnen-20-one

Following the procedure of Example 1 above, 3β-hydroxy-5,16-pregnadien-20-one is epoxidized to obtain 5α,6α-epoxy-3β-hydroxy-16-pregnen-20-one.

Example 5 5α,6α-epoxy-3β-acetoxy-16-pregnen-20-one

Following the procedure of Example 1 above, 3β-acetoxy-5,16-pregnadien-20-one is epoxidized to obtain 5α,6α-epoxy-3β-acetoxy-16-pregnen-20-one.

Example 6 methyl 5α,6α-epoxy-3,11-diketo-17(20)-pregnen-21-oate 3-ethylene ketal Following the procedure of Example 1 above, methyl 3,11-diketo-5,17(20)-pregnadien-21-oate 3-ethylene ketal is epoxidized to obtain methyl 5α,6α-epoxy-3,11-diketo-17(20)-pregnen-21-oate 3-ethylene ketal.

EXAMPLE 7: 5α,6α-epoxy-17α-hydroxypregnane-3,20-dione 3,20-bisethylene ketal

Following the procedure of Example 1 above, 17α-hydroxy-5-pregnene-3,20-dione 3,20-bisethylene ketal is epoxidized to obtain 5α,6α-epoxy-17α-hydroxypregnane-3,20-dione 3,20-bisethylene ketal.

EXAMPLE 8: 5α,6α-epoxy-17α-acetoxypregnane-3,20-dione 3,20-bisethylene ketal

Following the procedure of Example 1 above, 17α-acetoxy-5-pregnene-3,20-dione 3,20-bisethylene ketal is epoxidized to obtain 5α,6α-epoxy-17α-acetoxypregnane-3,20-dione 3,20-bisethylene ketal.

EXAMPLE 9: 5α,6α-epoxy-11β-hydroxy-21-acetoxy-16-pregnene-3,20-dione 3,20-bisethylene ketal Following the procedure of Example 1 above, 11β-hydroxy-21-acetoxy-5,16-pregnadiene-3,20-dione 3,20-bisethylene ketal is epoxidized to obtain 5α,6α-epoxy-11β-hydroxy-21-acetoxy-16-pregnene-3,20-dione 3,20-bisethylene ketal.

EXAMPLE 10: 5α,6α-epoxy-16-pregnene-3,20-dione 3,20-bisethylene ketal

Following the procedure of Example 1 above, 5,16-pregnadiene-3,20-dione 3,20-bisethylene ketal is epoxidized to obtain 5α,6α-epoxy-16-pregnene-3,20-dione 3,20-bisethylene ketal.

In the same manner following the procedure of Examples 1, 2 and 3 above, other steroids containing an isolated double bond at the 5,6-position can be stereoselectively epoxidized with peroxytrifluoroacetic acid or peroxytrichloroacetic acid to obtain the corresponding 5α,6α-epoxide in high yield. The following conversions are representative:

5-pregnene-3,20-dione 3,20-bisethylene ketal to obtain 5α,6α-epoxypregnane-3,20-dione 3,20-bisethylene ketal;

17β-hydroxy-5-androsten-3-one 3-propylene ketal to obtain 5α,6α-epoxy-17β-hydroxyandrostan-3-one 3-propylene ketal;

cholesteryl chloride to obtain 3β-chloro-5α,6α-epoxycholestane;

17α,20;20,21-bismethylenedioxy-5-pregnene-3,4-dione 3-ethylene ketal to obtain 17,20;20,21-bismethylenedioxy-5α,6α-epoxypregnan-3,11-dione 3-ethylene ketal;

17β-acetoxy-5-androsten-3-one 3-ethylene ketal to obtain 17β-acetoxy-5α,6α-epoxyandrostan-3-one 3-ethylene ketal;

17α,21-diacetoxy-5-pregnene-3,11,21-trione 3-ethylene ketal to obtain 17α,21-diacetoxy-5α,6α-epoxypregnane-3,11,21-trione 3-ethylene ketal;

19-nor-5-androstene-3β,17β-diol diacetate to obtain 19-nor-5α,6α-epoxy androstane-3β,17β-diol diacetate;

3β-acetoxy-17β-cyano-5,16-androstadiene to obtain 5α,6α-epoxy-17β-cyano-16-androstene-3β-ol acetate; and Δ⁵-cholestene to obtain cholestane 5α,6α-epoxide.

I claim:

1. In the process for the epoxidation of an isolated 5,6-double bond in a steroid molecule having a ketal derivative of a ketone group at the 3-position with an organic peracid to obtain the corresponding 5α,6α-epoxide, the improvement which comprises carrying out the reaction with peroxytrifluoroacetic acid or peroxytrichloroacetic acid in an organic solvent medium of low polarity which promotes intramolecular hydrogen bonding within the peracid molecule and in the presence of a basic buffering agent.

2. The process for the stereoselective 5α,6α-epoxidation of an isolated 5,6-double bond in a steroid molecule having a ketal derivative of a ketone group at the 3-position: which comprises subjecting said steroid to epoxidation with peroxytrifluoroacetic acid or peroxytrichloroacetic acid in an organic solvent medium of low polarity which promotes intramolecular hydrogen bonding within the peracid molecule and in the presence of a basic buffering agent to obtain the corresponding 5α,6α-epoxide.

3. The process of claim 2, wherein the organic solvent is selected from the group consisting of methylene chloride, benzene, chlorobenzene, toluene, chloroform, bromobenzene, o-dichlorobenzene, xylene, ethylene dichloride and mixtures thereof.

4. The process of claim 2, wherein the starting steroid is 11α-acetoxy-5-pregnene-3,20-dione 3,20-bisethylene ketal and the 5α,6α-epoxide obtained is 5α,6α-epoxy-11α-acetoxypregnane-3,20-dione 3,20-bisethylene ketal.

5. The process of claim 2, wherein the starting steroid is 5-pregnene-3,20-dione 3,20-bisethylene ketal and the 5α,6α-epoxide obtained is 5α,6α-epoxypregnane-3,20-dione 3,20-bisethylene ketal.

6. The process of claim 2, wherein the starting steroid is 11β-hydroxy-5-pregnene-3,20-dione 3,20-bisethylene ketal and the 5α,6α-epoxide obtained is 5α,6α-epoxy-11β-hydroxypregnane-3,20-dione 3,20-bisethylene ketal.

7. The process of claim 2, wherein the starting steroid is methyl 3,11-diketo-5,17(20)-pregnadien-21-oate 3-ethylene ketal and the 5α,6α-epoxide obtained is methyl 5α,6α-epoxy-3,11-diketo-17(20)-pregnen-21-oate 3-ethylene ketal.

8. The process of claim 2, wherein the starting steroid is 17α-hydroxy-5-pregnene-3,20-dione 3,20-bisethylene ketal and the 5α,6α-epoxide obtained is 5α,6α-epoxy-17α-hydroxypregnane-3,20-dione 3,20-bisethylene ketal.

9. The process of claim 2, wherein the starting steroid is 17α-acetoxy-5-pregnene-3,20-dione 3,20-bisethylene ketal and the 5α,6α-epoxide obtained is 5α,6α-epoxy-17α-acetoxypregnane-3,20-dione 3,20-bisethylene ketal.

10. The process of claim 2, wherein the starting steroid is 11β-hydroxy-21-acetoxy-5,16-pregnadiene-3,20-dione 3,20-bisethylene ketal and the 5α,6α-epoxide obtained is 5α,6α-epoxy-11β-hydroxy-21-acetoxy-16-pregnene-3,20-dione 3,20-bisethylene ketal.

11. The process of claim 2, wherein the starting steroid is 5,16-pregnadiene-3,20-dione 3,20-bisethylene ketal and the 5α,6α-epoxide obtained is 5α,6α-epoxy-16-pregnene-3,20-dione 3,20-bisethylene ketal.

* * * * *